(12) United States Patent
Bredoire (10) Patent No.: US 10,801,550 B1
(45) Date of Patent: Oct. 13, 2020

(54) ENCODER SYSTEM AND METHOD OF ASSEMBLY FOR LARGE BEARINGS

(71) Applicant: Aktiebolaget SKF, Gothenburg (SE)

(72) Inventor: Vincent Bredoire, Pourrain (FR)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 16/524,244

(22) Filed: Jul. 29, 2019

(51) Int. Cl.
  *F16C 41/00* (2006.01)

(52) U.S. Cl.
  CPC .......... *F16C 41/007* (2013.01); *F16C 41/002* (2013.01); *F16C 2226/18* (2013.01); *F16C 2226/80* (2013.01)

(58) Field of Classification Search
  CPC .. F16C 41/002; F16C 41/007; F16C 2300/14; F16C 2226/80; F16C 2226/18; F16C 2226/62; F16C 2226/70; G01P 3/443
  See application file for complete search history.

(56) References Cited

U.S. PATENT DOCUMENTS

| | | | | |
|---|---|---|---|---|
| 5,611,545 A * | 3/1997 | Nicot | ...................... | G01P 3/443 277/402 |
| 6,113,276 A * | 9/2000 | Bourgeois-Jacquet | ...................... | F16C 19/362 324/207.25 |
| 8,950,339 B2 * | 2/2015 | Turmeau | ............... | F16C 41/007 105/218.1 |
| 2016/0312835 A1 * | 10/2016 | Nicolas | .................... | F16C 19/52 |
| 2017/0082148 A1 * | 3/2017 | Nicolas | ................ | F16C 41/007 |
| 2017/0350453 A1 * | 12/2017 | Capoldi | ............... | G01N 29/043 |
| 2019/0309810 A1 * | 10/2019 | Sabeti | ..................... | B60T 8/329 |

* cited by examiner

Primary Examiner — Alan B Waits
(74) Attorney, Agent, or Firm — Garcia-Zamor Intellectual Property Law; Ruy Garcia-Zamor; Bryan Peckjian (57) ABSTRACT

An encoder system mounted on a large diameter bearing, the large diameter bearing having an inner ring and an outer ring, the encoder system providing a tensioning assembly mounted in a pre-machined portion of the inner ring, the tensioning assembly including a first tensioning part having a first machined recess and a first groove, and a second tensioning part having a second groove, the second tensioning part conforming in size and shape to the first recess and disposed within the first machined recess. The tensioning assembly is centered and fixed on to the inner ring. An encoder assembly mounted on the outer ring, the encoder assembly including a first encoder part fixed to the outer ring, and a second encoder part fixed to the first encoder part and aligned in front of the encoder band. A method of assembling an encoder system to a large diameter bearing is also provided.

14 Claims, 8 Drawing Sheets

ENCODER SYSTEM AND METHOD OF ASSEMBLY FOR LARGE BEARINGS

TECHNOLOGICAL FIELD

This invention relates to an encoder system and associated encoder band used on large bearings. This invention also relates to a tensioning system for the encoder band that is integrated onto one of the bearing rings.

BACKGROUND OF THE INVENTION

Handling of large diameter bearings is risky and difficult. Consequently, damage can occur when building encoder systems directly into the inner and outer bearing rings of large bearings. This damage includes expensive lost product and manufacturing time.

By attaching a small machined part greatly reduces the potential for damage and lost time. The present invention facilitates this realization and greatly reduces the damage during handling operations and consequently the manufacturing costs.

SUMMARY OF THE INVENTION

An object of the invention is to provide an encoder system that is mounted on a large diameter bearing, the large diameter bearing having an inner ring and an outer ring, the encoder system providing: a tensioning assembly mounted in a pre-machined portion of the inner ring, the tensioning assembly including: a first tensioning part having a first machined recess and a first groove, and a second tensioning part having a second groove, the second tensioning part conforming in size and shape to the first recess and disposed within the first machined recess, wherein the tensioning assembly is centered and fixed on to the inner ring, a third groove disposed on an outer surface of the inner ring, an encoder band fixed within the first groove, second groove, and third groove, and an encoder assembly mounted on the outer ring, the encoder assembly including: a first encoder part fixed to the outer ring, and a second encoder part fixed to the first encoder part and aligned in front of the encoder band.

In a second aspect of the present invention, the second tensioning part provides at least one magnet that is configured to magnetically mount the second tensioning part to the first tensioning part on a rear inner portion of the first recess.

In a third aspect of the present invention, the large diameter bearing is a slewing bearing.

In a further aspect of the present invention, the first tensioning part is a machined block having the recess machined into an outer side.

In a further aspect the pre-machined portion of the inner ring provides a slot into which the tensioning assembly is configured to be mounted.

In a further aspect of the invention encoder band is made from a single straight piece of band material having two open ends.

In a further aspect of the present invention, the two open ends of the encoder band are joined together at the second tensioning part, the joining preventing any slippage of the encoder band around the inner ring.

In a further aspect of the present invention, the encoder assembly is mounted to a top surface of the outer ring.

In a further aspect of the present invention, the second encoder part is a sensor that senses pulsed signals from the encoder band in order to determine a rotary encoded position.

In a further aspect of the present invention, the encoder assembly is at least one of bolted and/or pinned to the outer ring.

In a further aspect of the present invention, the second encoder part is a wireless sensor that wirelessly transmits the sensed pulsed signals from the encoder band.

In a further aspect of the present invention, a method for assembling an encoder system to a large diameter bearing, the large diameter bearing having an inner ring and an outer ring, the method including the steps of: providing a tensioning assembly including; a first tensioning part having a first machined recess, and a second tensioning part, the second tensioning part conforming in size and shape to the first machined recess and having a cleat, inserting the second tensioning part into the first machined recess and securing it into place, inserting the tensioning assembly in a pre-machined portion of the inner ring and securing it in place, machining simultaneously a first groove in an outer diameter of the first tensioning part, a second groove in an outer diameter of the second tensioning part, and a third groove in an outer diameter of the inner ring, and wherein the simultaneous machining of the first groove, the second groove, and third groove in their respective outer diameters assures the second groove of the second tensioning part is centered with respect to the third groove on the inner ring.

In a further aspect of the present invention the method including the steps of fixing an encoder band fabricated from a single straight piece of band material having two open cut ends in the first groove disposed on an outer surface of the inner ring and in the second groove of second tensioning part, gluing the encoder band within the first, second and third machined grooves disposed on the inner ring, locating the two open cut ends of the encoder band within the second tensioning part, and securing the two open cut ends of the encoder band within the cleat of the second tensioning part thus preventing any slippage between itself and the tensioning assembly.

In a final aspect of the present invention, the method including the steps of: mounting an encoder assembly on the outer ring, the encoder assembly including: fixing a first encoder part to the outer ring, fixing a second encoder part to the first encoder part, and providing four elongated holes and four bolts vertically extending therethrough the second encoder part, the elongated holes and bolts provided to adjust a calibrated position of the second encoder part, and aligning the second encoder part at a predetermined position with a spacer foil placed directly in front of the encoder band and tightening the bolts extending therethrough the second encoder part in order to set a calibrated position.

BRIEF DESCRIPTION OF THE SEVERAL VIEWS OF THE DRAWINGS

The invention will now be explained in correspondence with the annexed figures, as illustrative examples, without restricting the object of the invention. In the annexed figures.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
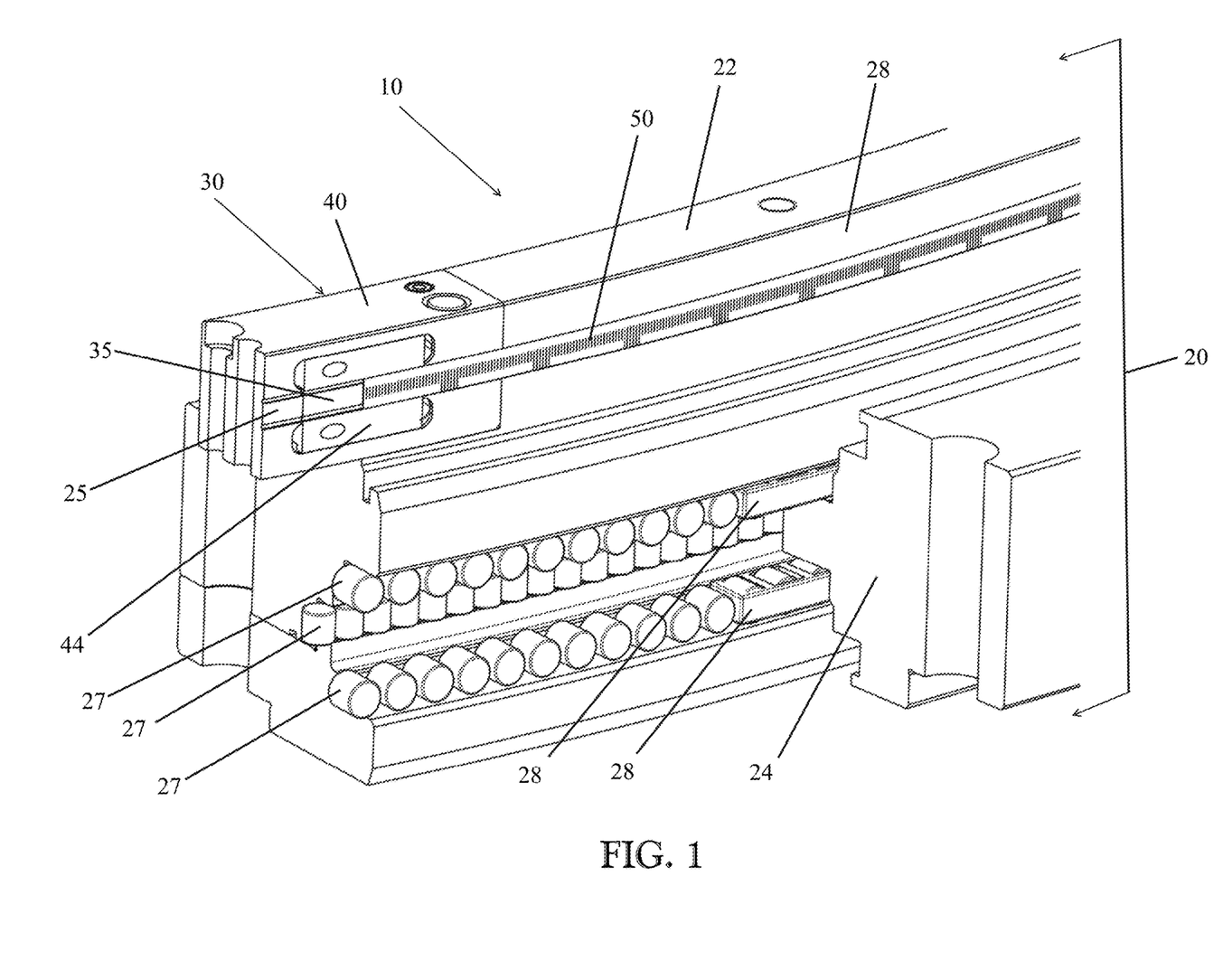
FIG. 1 is a cut away schematic view of an encoder assembly mounted on a large diameter bearing according to a first embodiment of the present invention.

For purposes of description herein, the terms "inward," "outward," "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

General Description of the Invention

For purposes of the present invention, an encoder system associated with an encoder band is employed upon a large bearing. For this purpose, a tensioner system for the encoding band must be integrated on one of the bearing rings. The objective is therefore to make the machining necessary for the integration of the tensioner on a separate part of the bearing and then attach this part on the bearing at the customers facility instead of directly machining the ring at the OEM.

Integration of an encoder system associated with an encoder band on a large bearing is very often a driven by a customer request. The encoder band must be mounted in a manner imposed by the provider of this system. That is, by the customer and not the OEM factory.

This strip must be glued into a groove made on one of the bearing rings and associated with a tensioner system that will join the 2 ends of the band. This tensioner system must be integrated into a complex housing and dimensions imposed by the factory. This housing is even more complicated to realize on a large bearing.

It is therefore impossible to completely fabricate the assembly in an OEM plant and then send the machining required on the bearing out to a subcontractor. This would be costly and would increase the risks associated with the handling of the ring in the plant, at the subcontractor and during transport. The invention facilitates the realization of the required machining, to reduce the handling operations and consequently the manufacturing costs.

Encoder System

There is shown in FIG. 1, a cut away schematic view of an encoder system 10 mounted on a large diameter bearing 20 for example, on a slewing bearing. The large diameter bearing typically provides an inner ring 22 and an outer ring 24 and cylindrical rolling elements 27 disposed in cages 28 located therebetween in order to facilitate smooth rotation between the inner 22 and outer ring 24.

Figure 2:
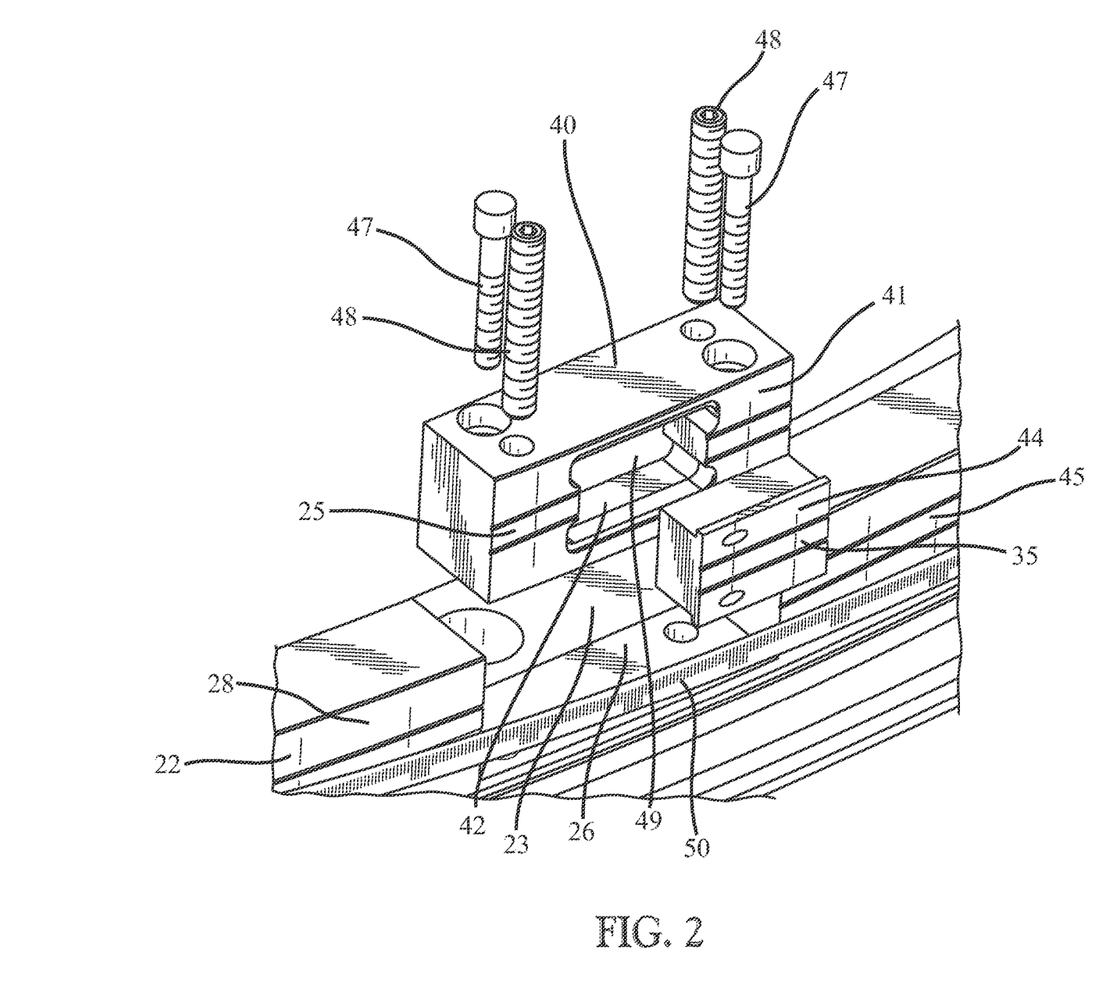
FIG. 2 is an elevated exploded view of a tensioning assembly according to the first embodiment of the present invention.

As illustrated in FIG. 2, a block shaped tensioning assembly 30 is configured to be mounted in a pre-machined portion 26 of the inner ring 22. In the present embodiment the pre-machined portion 26 is a slot 23 that is cut through the top surface of the inner ring 22. The slot 23 is configured to conform in size and shape to the tensioning assembly 30 so that when assembled, they fit together seamlessly in all directions.

The tensioning assembly 30 includes a first tensioning 40 part having a first groove 25, and a second tensioning part 44 having a second groove 35. The first tensioning part 40 includes a first machined recess 42 machined in an outer surface 41 of the first tensioning part.

The second tensioning part 44 conforms in size and shape to the first recess 42 and is disposed within the first machined recess 42. The tensioning assembly 30 is centered and fixed on to the inner ring 22. Here, the tensioning assembly 40 may be bolted 47 or pinned 48 or a combination of being both bolted and pinned to the inner ring 24.

Figure 3:
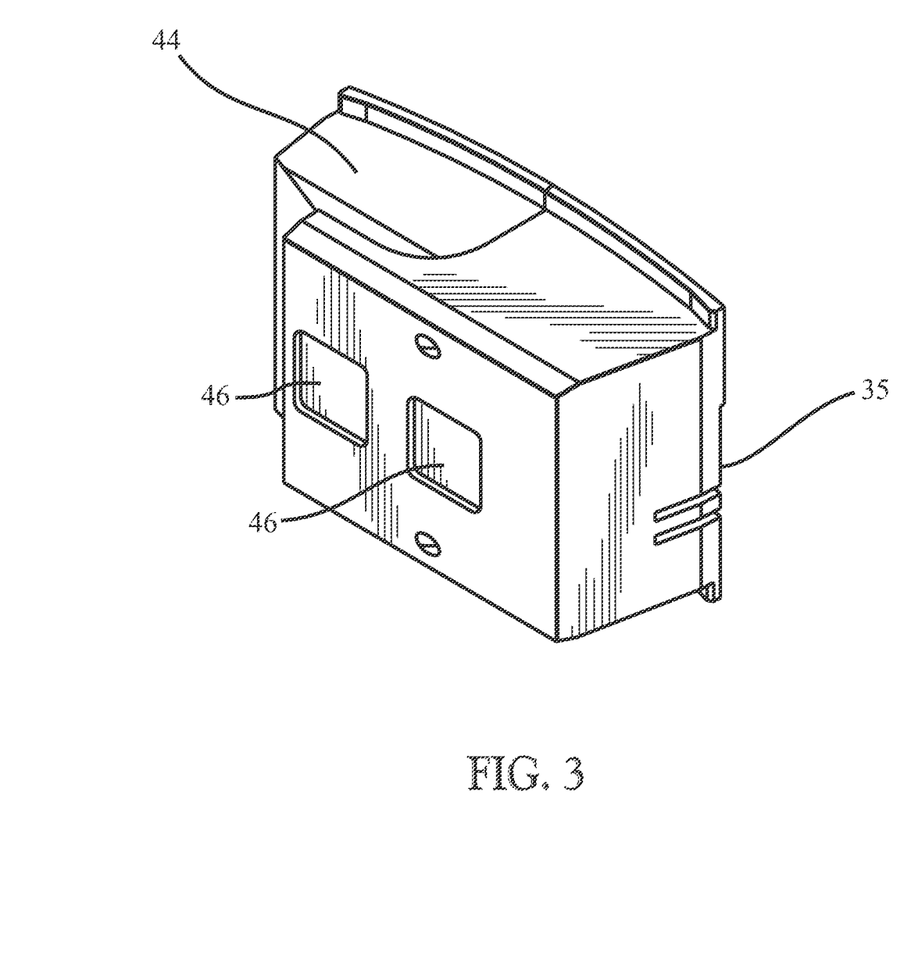
FIG. 3 is a schematic view of a cleat having magnetic mounting magnets to speed installation into a first machined part according to the first embodiment of the present invention.

In FIG. 3, the second tensioning part 44 is shown providing at least one magnet 46 that is configured to magnetically mount the second tensioning part 44 to the first tensioning part 40. The at least one magnet 46 contacts an inner rear portion 49 of the first machined recess 42.

Figure 4:
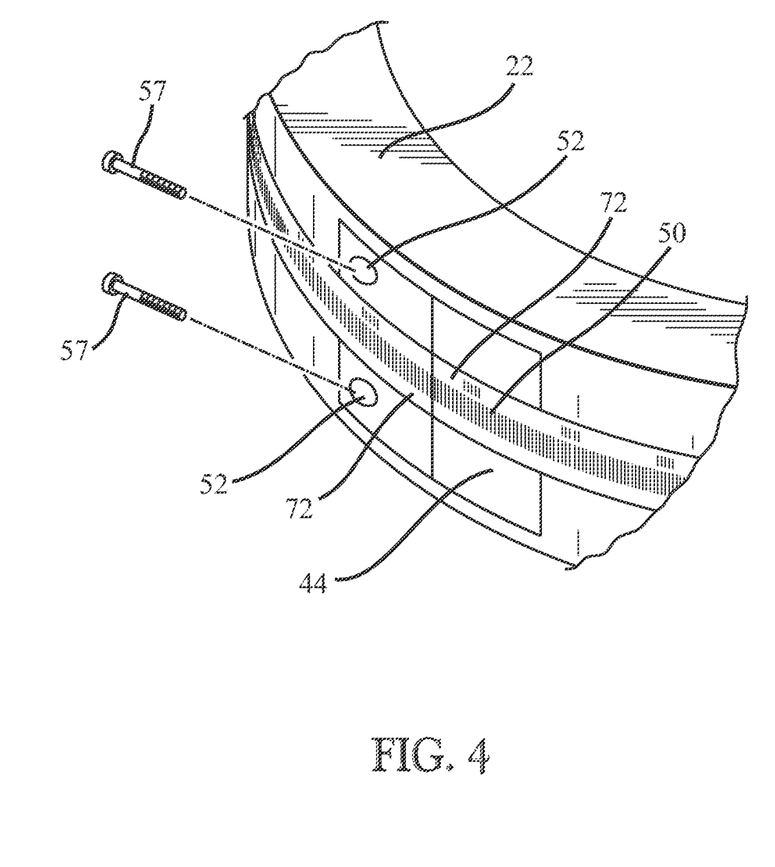
FIG. 4 is a schematic view of the cleat being fixed into the tensioning assembly according to the first embodiment of the present invention.

In FIG. 4, the at least one magnet 46 retains the second tensioning part 44 inside the first machined recess 42 until screws 57 are tightened within through holes 52 into threaded holes (not shown) in the first tensioning part 40.

FIG. 2 also depicts a third groove 45 that is disposed on an outer surface 28 of the inner ring 22. FIGS. 1 and 2 additionally show an encoder band 50 that is fixed within the first groove 25, the second groove 35, and the third groove 45. The encoder band 50 is made from a single straight piece of band material having two open ends 72. See also FIG. 4 that shows the two separate ends of the encoder band.

Here, the encoder band 50 is fixed by being glued in place within the first 25, second 35 and third 45 grooves. The second tensioning part 44 may provide a cleat 44 that is disposed within the tensioner assembly 30. The cleat 44 joins the two open ends 72 of the encoder band 50 together and prevents any slippage of the encoder band 70 around the inner ring 22. Here, the two open ends 72 of the encoder band are fixed by being glued to the cleat 44.

Figure 5:
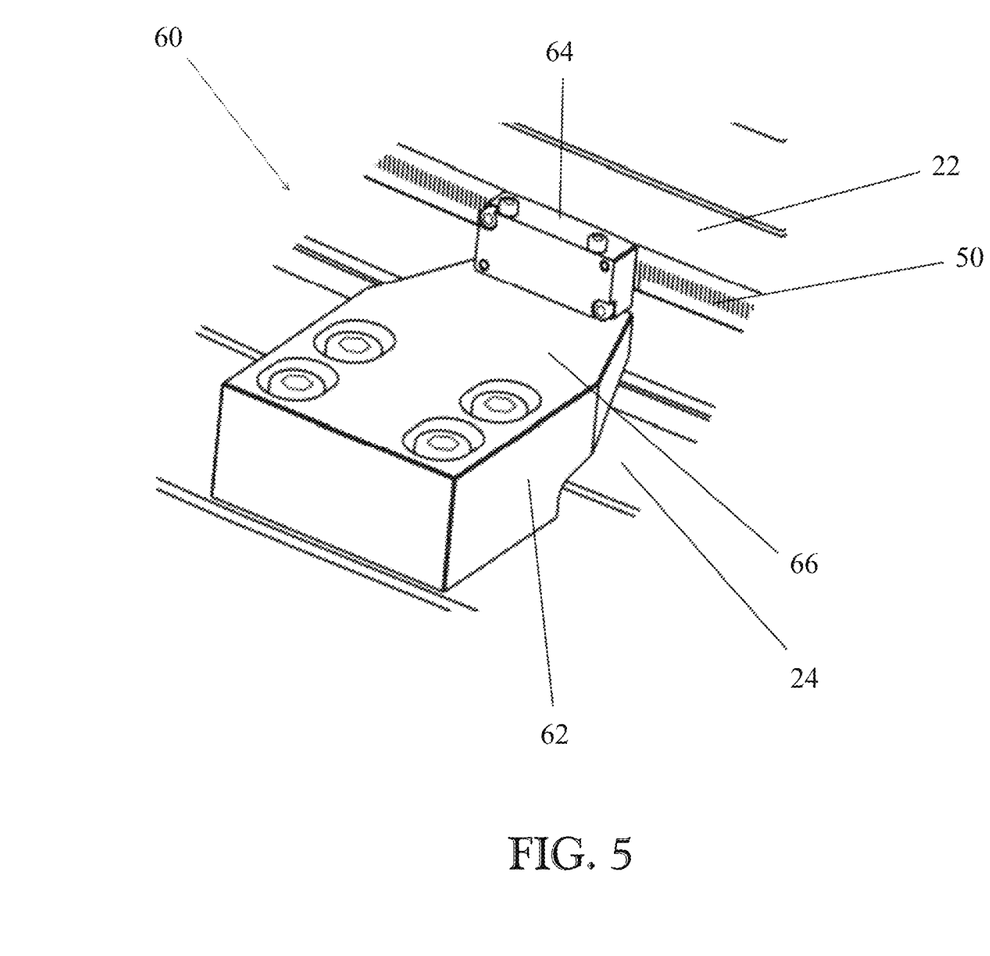
FIG. 5 is a schematic view of an encoder being aligned according to the first embodiment of the present invention.

An encoder assembly 60 that is mounted on the outer ring 24 is shown in FIG. 5. The encoder assembly 60 includes a first encoder part 62 that is fixed to a top surface of the outer ring 24, and a second encoder part 64 that is fixed to the first encoder part 62.

In the present embodiment, bolts are shown being employed to mount the first encoder part to the outer ring and the second encoder part to the first encoder part. Other ways to mount the encoder assembly components are available.

Figure 6:
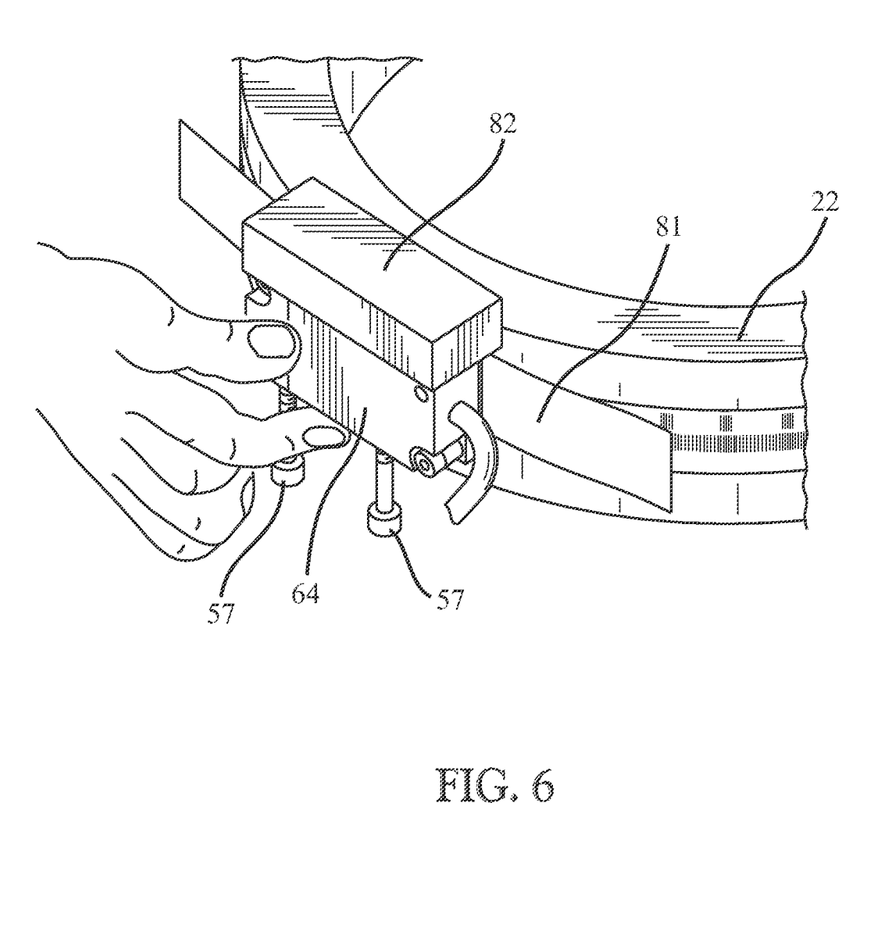
FIG. 6 is a schematic view of an encoder assembly mounted to an outer ring according to the first embodiment of the present invention.

FIG. 6 shows the second encoder part 64 being aligned in front of the encoder band. Here, the second encoder part 64 is a sensor 64 that senses pulsed signals from the encoder band in order to determine a rotary encoded position. The second encoder part 64 may be a wireless sensor 64 that wirelessly transmits sensed pulsed signals from the encoder band as the bearing rotates.

Figure 7:
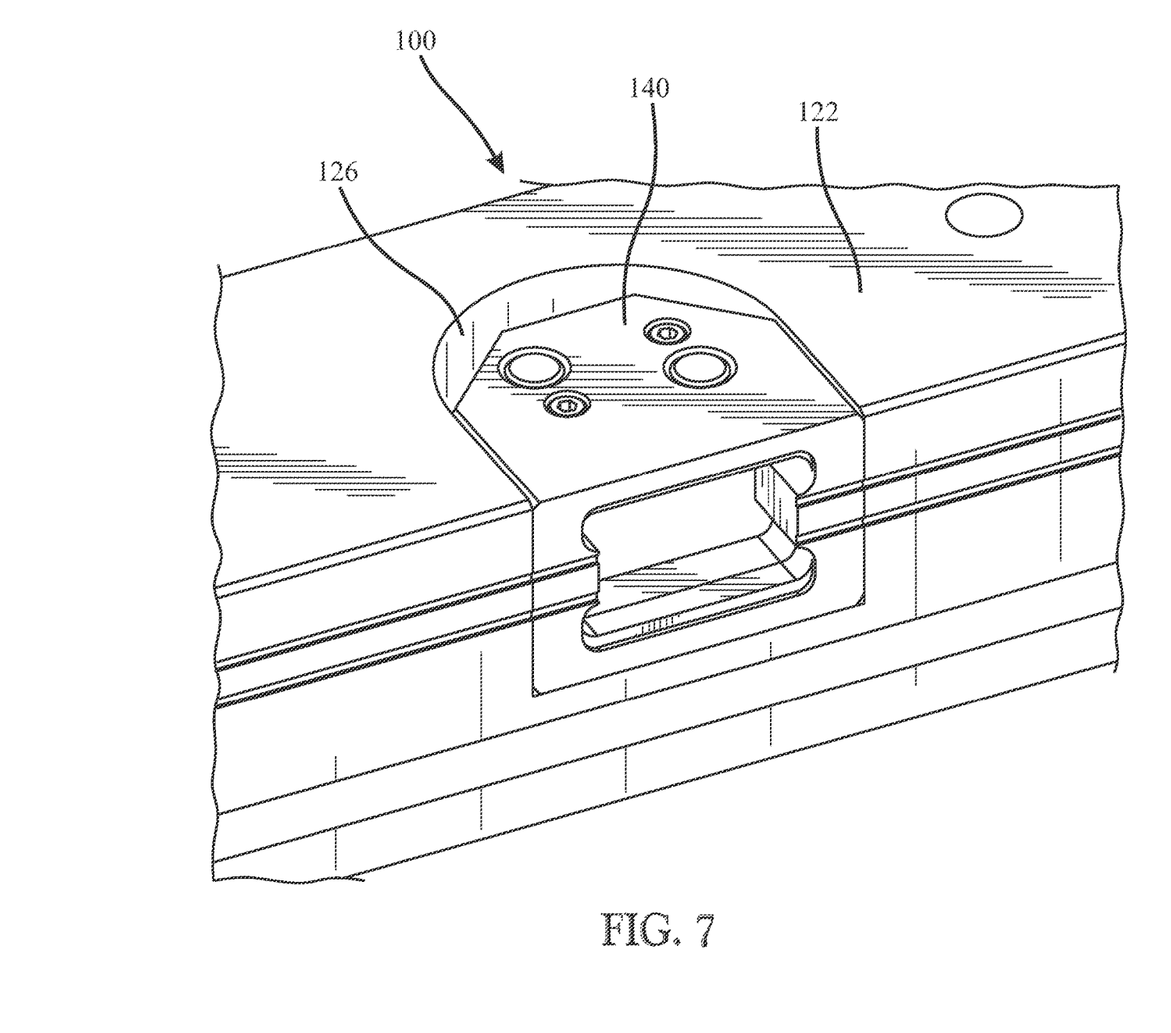
FIG. 7 is a schematic view of an alternate embodiment of a tensioning assembly according to a second embodiment of the present invention.

FIG. 7 illustrates an alternate embodiment 100 of the present invention where everything is the same, but a u-shaped slot 126 is pre-machined into an inner ring 122 instead of the full slot 23 previously shown and described. Here, a first tensioning part 140 is shown being mounted to and conforming in size and shape with the u-shaped slot 126.

Method of Assembly

Figure 8:
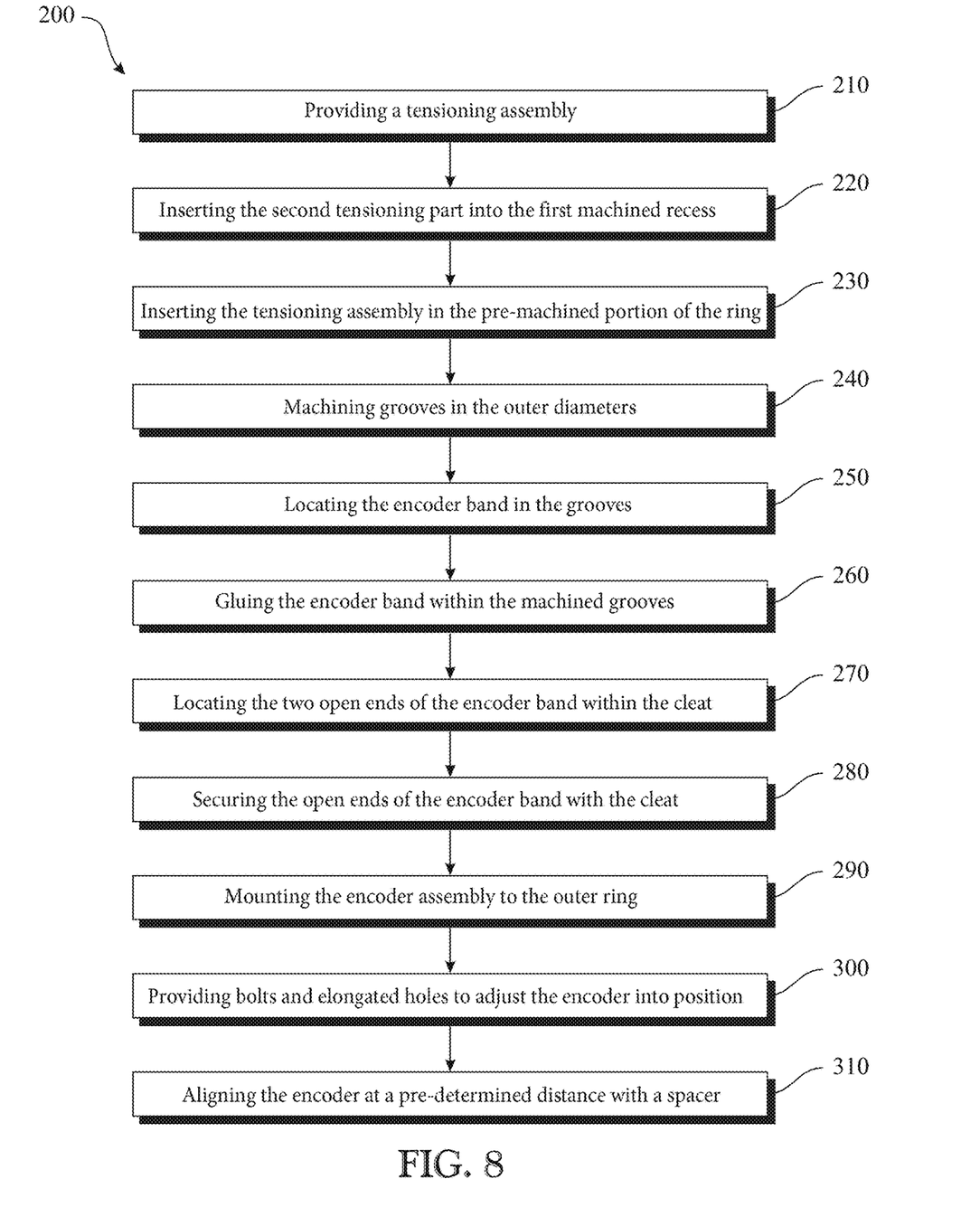
FIG. 8 is a block diagram showing the method steps for assembling the encoder system to a large diameter bearing according to the present invention.

There is shown in FIG. 8 a block diagram illustrating a method 200 for assembling the encoder system 100 to the large diameter bearing 20, where the large diameter bearing includes the inner ring 22 and the outer ring 24.

The method having a first step 210 of providing the tensioning assembly 30. The tensioning assembly including the first tensioning part 40 having the first machined recess 42, and the second tensioning part 44, the second tensioning part having the cleat and conforming in size and shape to the first machined recess 42.

The method further having a step 220 of inserting the second tensioning part 44 into the first machined recess 42 and securing it into place.

The method including a step 230 of inserting the tensioning assembly in the pre-machined portion 26 of the inner ring 22 and securing it in place.

The method further including a step 240 of simultaneously machining the first groove 25 in an outer diameter of the first tensioning part 40, the second groove 35 in an outer diameter of the second tensioning part, and the third groove 45 in an outer diameter of the inner ring 22. The simultaneous machining of the first groove, the second groove, and third groove in their respective outer diameters assures the second groove of the second tensioning part is centered with respect to the third groove on the inner ring.

The method providing a step 250 of fixing the encoder band fabricated from a single straight piece of band material having two open cut ends in the first groove disposed on the outer surface of the inner ring and in the second groove of second tensioning part.

The method further providing a step 260 of gluing the encoder band within the first, second and third machined grooves disposed on the inner ring.

In a step 270, the two open cut ends of the encoder band are located within the second tensioning part.

In a step 280 the two open cut ends of the encoder band are secured within the cleat of the second tensioning part. Once secured, any slippage between itself and the tensioning assembly is prevented.

In a step 290, an encoder assembly is mounted on the outer ring. The encoder assembly including fixing the first encoder part to the outer ring and fixing the second encoder part to the first encoder part.

In step 300, four elongated holes and four bolts are provided to vertically extending therethrough the second encoder part. The elongated holes and bolts provided to adjust a calibrated position of the second encoder part. That is, the elongated holes provide room to adjust the position of the second encoder part when the bolts are located.

Finally, in step 310, the second encoder part is aligned at a predetermined position or distance with a spacer foil placed directly in front of the encoder band. Once the precise location is determined, the bolts extending therethrough the second encoder part are tightened in order to set a calibrated position. The calibrated position is determined by testing/observing the waveform of the signal output of the second encoder part when rotated past the encoder band.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. An encoder system mounted on a bearing, the bearing having an inner ring and an outer ring, the encoder system comprising:
    a tensioning assembly mounted in a pre-machined portion of the inner ring, the tensioning assembly including:
        a first tensioning part having a first machined recess and a first groove, and
        a second tensioning part having a second groove, the second tensioning part conforming in size and shape to the first recess and disposed within the first machined recess, wherein the tensioning assembly is centered and fixed on to the inner ring,
    a third groove disposed on an outer surface of the inner ring,
    an encoder band fixed within the first groove, second groove, and third groove, and
    an encoder assembly mounted on the outer ring, the encoder assembly including:
        a first encoder part fixed to the outer ring, and
        a second encoder part fixed to the first encoder part and aligned in front of the encoder band.

2. The encoder system according to claim 1, wherein the second tensioning part provides at least one magnet that is configured to magnetically mount the second tensioning part to the first tensioning part on a rear inner portion of the first recess.

3. The encoder system according to claim 1, wherein the bearing is a slewing bearing.

4. The encoder system according to claim 1, wherein the first tensioning part is a machined block having the recess machined into an outer side.

5. The encoder system according to claim 1, wherein the pre-machined portion of the inner ring provides a slot into which the tensioning assembly is configured to be mounted.

6. The encoder system according to claim 1, wherein the encoder band is made from a single straight piece of band material having two open ends.

7. The encoder system according to claim 6, wherein the two open ends of the encoder band are joined together at the second tensioning part, the joining preventing any slippage of the encoder band around the inner ring.

8. The encoder system according to claim 1, wherein the encoder assembly is mounted to a top surface of the outer ring.

9. The encoder system according to claim 8, wherein the encoder assembly is at least one of bolted and/or pinned to the outer ring.

10. The encoder system according to claim 1, wherein the second encoder part is a sensor that senses pulsed signals from the encoder band in order to determine a rotary encoded position.

11. The encoder system according to claim 10, wherein the second encoder part is a wireless sensor that wirelessly transmits the sensed pulsed signals from the encoder band.

12. A method for assembling an encoder system to a bearing, the bearing having an inner ring and an outer ring, the method comprising the steps of:
   providing a tensioning assembly including;
      a first tensioning part having a first machined recess, and
      a second tensioning part, the second tensioning part conforming in size and shape to the first machined recess and having a cleat,
   inserting the second tensioning part into the first machined recess and securing it into place,
   inserting the tensioning assembly in a pre-machined portion of the inner ring and securing it in place,
   machining simultaneously a first groove in an outer diameter of the first tensioning part, a second groove in an outer diameter of the second tensioning part, and a third groove in an outer diameter of the inner ring, and wherein
   the simultaneous machining of the first groove, the second groove, and third groove in their respective outer diameters assures the second groove of the second tensioning part is centered with respect to the third groove on the inner ring.

13. The method for assembling an encoder system to a bearing of claim 12, further comprising the steps of:
   fixing an encoder band fabricated from a single straight piece of band material having two open cut ends in the first groove disposed on an outer surface of the inner ring and in the second groove of second tensioning part,
   gluing the encoder band within the first, second and third machined grooves disposed on the inner ring,
   locating the two open cut ends of the encoder band within the second tensioning part, and
   securing the two open cut ends of the encoder band within the cleat of the second tensioning part thus preventing any slippage between the encoder band and the tensioning assembly.

14. The method for assembling an encoder system to a bearing of claim 12, comprising the step of:
   mounting an encoder assembly on the outer ring, the encoder assembly including:
      fixing a first encoder part to the outer ring,
      fixing a second encoder part to the first encoder part, and
   providing four elongated holes and four bolts vertically extending therethrough the second encoder part, the elongated holes and bolts provided to adjust a calibrated position of the second encoder part, and
   aligning the second encoder part at a predetermined position with a spacer foil placed directly in front of the encoder band and tightening the bolts extending therethrough the second encoder part in order to set a calibrated position.

* * * * *